UNITED STATES PATENT OFFICE.

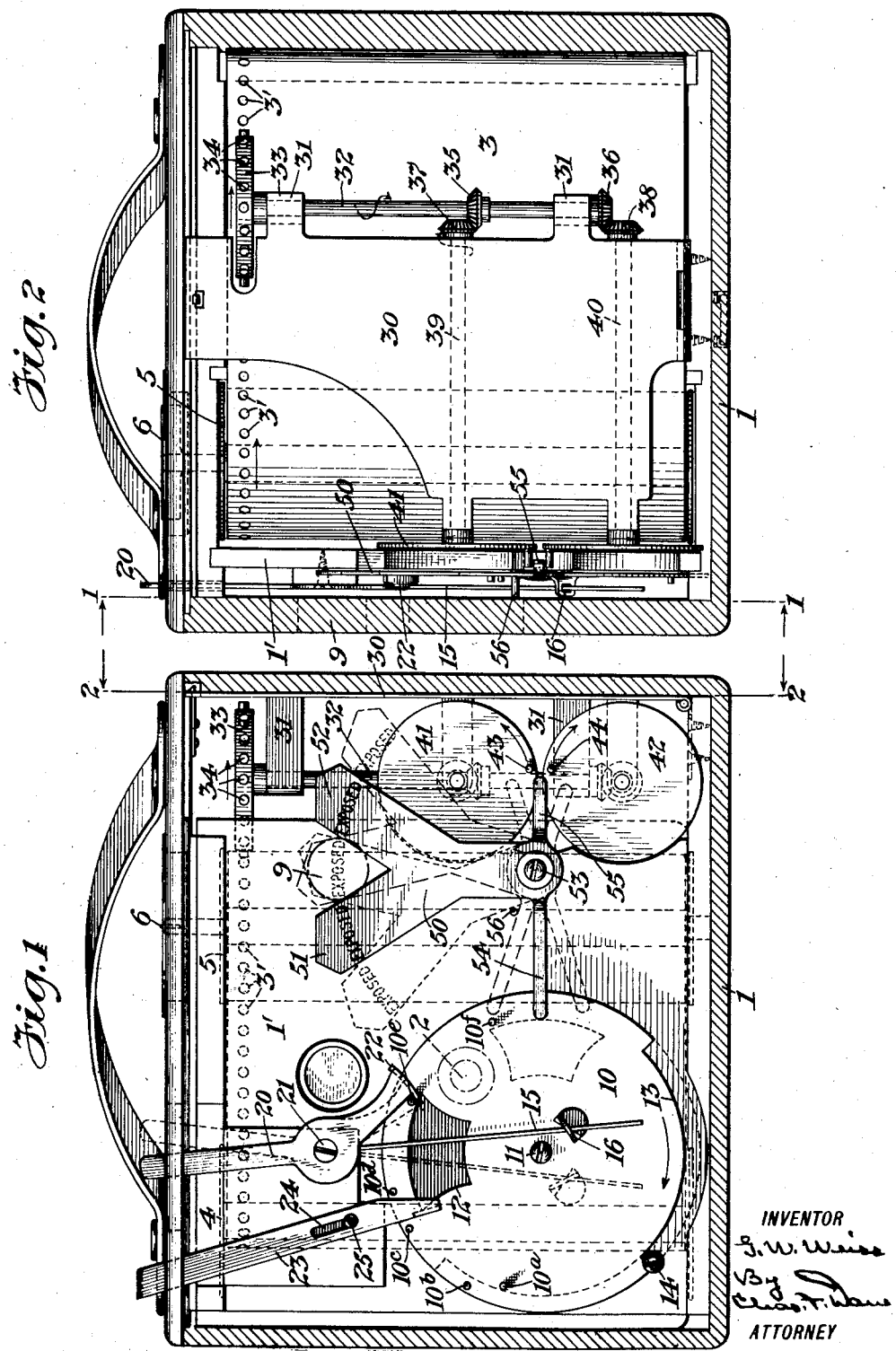

GEORGE W. WEISS, OF BROOKLYN, NEW YORK.

EXPOSURE-INDICATOR FOR PHOTOGRAPHIC CAMERAS.

1,321,868.   Specification of Letters Patent.   Patented Nov. 18, 1919.

Application filed November 15, 1916. Serial No. 131,448.

*To all whom it may concern:*

Be it known that I, GEORGE W. WEISS, a citizen of the United States, and resident of New York, borough of Brooklyn, in the county of Kings and State of New York, have invented certain new and useful Improvements in Exposure - Indicators for Photographic Cameras, of which the following is a specification.

The invention relates to indicators for photographic cameras, designed to display a visible sign whenever an exposed section or element of the sensitized surface or medium is in position behind the lens, and thereby to give a positive indication that the apparatus is not in proper condition for another exposure. To this end, the invention involves in combination with a magazine camera having a movable shutter, of any preferred type, of a movable semaphore, adjustable with respect to a sight opening in the camera box, which is actuated by the movement of the shutter to display an exposure indication on said semaphore through said opening, together with means operated by the advance of the sensitized medium to restore the semaphore to its normal position and thereby apprise the operator that the previously exposed sensitized surface has been withdrawn from behind the lens, and that a fresh surface has been adjusted to proper position for an exposure.

The invention is illustrated in one of its simplest forms of application in the accompanying drawings, in which—

Figure 1 is a sectional front elevation of a camera of the roll-film, oscillating-shutter type, having the invention applied thereto, the section being taken on the line 1—1 of Fig. 2.

Fig. 2 is a sectional side elevation on line 2—2 of Fig. 1.

Referring to the drawings, as exemplifying a typical application of the invention, 1 indicates the box or housing of an ordinary hand camera provided with a transverse partition 1' which constitutes a lens board and a support for certain of the adjuncts of the camera, such as the shutter, its operating mechanism, and the indicating device or semaphore which is involved in the present invention. Mounted in the partition 1' is a lens 2, shown in dotted lines in Fig. 1, and mounted on suitable rolls 4 and 5 in the chamber or compartment behind the lens board is a strip or roll-film 3, such as is commonly employed in cameras of this character, one of the rolls 5 being provided with an operating hand-piece 6 by means of which the film may be fed across the rear of the interior frame or housing in the usual manner.

Pivotally mounted on the lens board 1' by means of a central stud or screw 11 is an oscillating shutter 10 having a sight opening 12 which is adapted to move across the lens opening 2, and said shutter is provided with a series of projecting studs or pins $10^a$, $10^b$, $10^c$, $10^d$, and $10^e$, which coöperate with a latch or trigger 20 pivoted at 21 to the lens board and provided with the usual cam flange 22 which coöperates with the pins $10^b$ to $10^e$ respectively, depending on whether an instantaneous or a time exposure is desired, as will be understood. Slidably mounted on the lens board 1' by means of the pin and slot connection 24, 25 is a lever 23 which, when raised, is interposed in the path of the pin $10^a$ and serves to arrest the movement of the shutter 10 so that the opening 12 registers with the lens 2 for time exposures, as will be understood. The lower portion of the shutter 10 is provided with a recessed edge 13 which coöperates with a fixed stop 14 to limit the movement of the shutter in both directions.

The front wall of the camera is provided with a sight opening 9, indicated in dotted lines in Fig. 1, which is adapted to coöperate with an oscillating arm, constituting a semaphore 50, which is preferably provided with two angularly disposed arms 51 and 52, preferably marked with the word "Exposed," so that when either of said arms 51 and 52 is brought into registry with the sight openings 9, it will give a proper indication that the section of sensitized medium lying behind the lens has been exposed and therefore must be withdrawn before another exposure is made. The semaphore 50 is pivoted to the lens board, as at 53, and extending laterally from the semaphore 50 in either direction are two arms 54 and 55. Projecting from the lens board in the angle between the arm 54 and semaphore 50 is a stop pin 56 which limits the movement of the semaphore in both of its extreme positions.

Mounted in vertical journal bearings 31, 31 on the supporting plate 30, attached to the inner frame of the camera, is a vertical shaft 32 provided at its top with a wheel 33 having radial teeth or pins 34, adapted to coöperate with spaced perforations 3' along the top edge of the film-roll 3, so that as said film-roll is progressed or moved from one roller to the other, the wheel 33 and shaft 32 are revolved. Mounted on the shaft 32 are two beveled gears 35 and 36 which coöperate respectively with beveled pinions 37 and 38 connected to the ends of horizontal shafts 39 and 40, journaled in bearings in the plate 30. On the forward ends of the shafts 39 and 40 are mounted disks 41 and 42 respectively, which carry on their outer faces near the peripheries thereof pins 43 and 44 respectively, which are adapted to coöperate with the horizontal arm 55 of the semaphore 50.

Mounted on the front face of the shutter 10 is an additional pin 10$^f$ which is adapted to engage the extreme end of the horizontal arm 54 of semaphore 50, and which therefore serves to move the semaphore to bring one of the upper arms thereof into registry with the sight opening 9 and to display the exposed indication.

The normal operation of the apparatus is as follows: Assuming that the relative disposition of the several elements illustrated in Fig. 1 is proper for an exposure of a section of the film 3, the shutter 10 is in closed position with the opening 12 displaced to the left of the lens 2 and the semaphore 50 stands in vertical position with its two arms 51 and 52 disposed on either side of the sight opening 9 and the transverse arms 54 and 55 of the semaphore are in horizontal position. If an instantaneous exposure is desired, the lever 20 is rocked to the right, thereby causing the end 22 thereof to pass out of engagement with the pin 10$^e$ and permitting the spring 15 to move the shutter 10 in a clockwise direction to the full extent of its throw and until the stop 14 engages the right hand shoulder of the cutaway portion 13 of the shutter. As the shutter rotates, the pin 10$^f$ strikes the outer end of arm 54 and rocks the semaphore 50 to the left until the latter is arrested by the stop 56, with the upper arm 52 of the semaphore lying directly behind the sight opening 9 to display the word "Exposed" to said sight opening. When the shutter has completed its operation, the sight opening therein will occupy the position indicated in dotted lines in Fig. 1, and the semaphore will be in the position indicated by the short dotted lines, namely, inclined to the left, and the word "Exposed" on the arm 52 will appear behind the sight opening and indicate that the section of the sensitized surface behind the lens has been exposed and is to be displaced before another exposure is made. When a fresh section of the sensitized surface is moved into proper position for exposure, as by rotating the roll 5 by means of the hand piece 6, the movement of the film 3 rotates the wheel 33 and shaft 32 which in turn rotates the disks 41 and 42 in opposite directions and the pin 43 on wheel 41 strikes the arm 55 of the semaphore and rocks the semaphore to vertical position, thereby withdrawing the arm 52 of the semaphore from registry with the sight opening 9.

In making a time exposure, the shutter is first oscillated in one direction to bring the sight opening 12 into registry with the lens 2, where it is held for a predetermined time by the engagement of stop 10$^a$ with the end of lever 23, after which the trigger 20 is operated in the opposite direction which permits the shutter to move in the opposite direction to cover the lens, as will be understood. Under these conditions, the pin 10$^f$ will swing the semaphore 50, as before, during its first movement, by engaging and depressing the arm 54, and said semaphore can only be restored by feeding a fresh section of film to position for exposure. In the reverse movement of the shutter, the end of arm 54 lies outside of the path of the pin 10$^f$. In cameras of this type, the time exposure lever 23 may be adjusted for operation when the shutter is in either of its extreme positions. For example, if the shutter occupies the position indicated in dotted lines with the sight opening 12 lying below the lens and the stop lever 23 be adjusted for a time exposure, the pin 10$^a$ coöperates with the opposite face of the lever 23, and the cam end 22 of trigger 20 coöperates with pins 10$^b$ and 10$^c$ respectively, that is to say, when the lever 23 is lifted and the trigger 20 is moved to the left, the pin 10$^b$ which engages the under face of the cam 22 slides from under said cam and permits the shutter to rotate in an anti-clockwise direction until the pin 10$^a$ engages the right hand side of lever 23 and the sight opening 12 is in registry with the lens. The trigger 20 is then released and the cam 22 passes to the right of pin 10$^c$. Then by swinging the trigger to the right, said pin 10$^c$ is permitted to pass out of engagement with the cam 22 and permits the shutter to swing to its closed position, as indicated in dotted lines in Fig. 1. During the opening movement of the shutter, the pin 10$^f$ strikes the end of arm 54 and rocks the semaphore to the right, thereby bringing the left-hand arm 51 of the semaphore in registry with the sight opening 9, the semaphore and its appurtenant parts occupying the position indicated by the long dotted lines in Fig. 1, with the arm 54 engaging stop 56. When a new section of film is moved behind the lens, the pin 44 on disk 42 strikes the depressed arm 55 of a semaphore and rocks the semaphore back to vertical position.

It will therefore be seen that the semaphore is positively actuated to display an exposure indication each and every time the shutter is moved to effect an exposure whether the latter be an instantaneous or a time exposure, and said semaphore is likewise restored to its normal or non-indicating position whenever a new sensitized surface is presented in proper position for exposure.

While the invention is illustrated as applied to a film-roll oscillating-shutter type of camera, it will be obvious that it is not limited to such type of apparatus, but is applicable to magazine cameras generally in which successive movements of the sensitized medium would serve to actuate the semaphore to restore the same to non-indicating position, and in which the movement of the shutter in making an exposure will move the semaphore to indicating position.

What I claim is:—

1. In a roll-film camera having a movable shutter and a sight opening, the combination of a pivoted semaphore adapted to be moved into and out of registry with said sight opening, arms carried by said semaphore, an abutment on the shutter to engage one of said arms to move the semaphore into registry with said opening, rotary members having abutments coöperating with the other arm to restore the semaphore, and means operated by the movement of the film to actuate said rotary members.

2. In a roll-film camera having a movable shutter and a sight opening, the combination of a pivoted semaphore adapted to be moved into and out of registry with said sight opening, arms carried by said semaphore, an abutment on the shutter to engage one of said arms to move the semaphore into registry with said opening, rotary members having abutments coöperating with the other arm to restore the semaphore, a wheel operated by the movement of the film, a shaft driven by said wheel, and shafts connected to said rotary members and geared to said first mentioned shaft whereby feeding movement of the film will restore said semaphore.

3. In a roll film camera having a movable shutter and a sight opening, the combination with a semaphore having arms radiating from its pivot point, of an abutment on the shutter adapted to engage one of said arms to move the semaphore into registration with the sight opening upon the movement of the shutter, and means for engaging the other arm to move the semaphore out of registration with the sight opening when the film is advanced.

4. In a roll film camera, having a movable shutter and a sight opening, the combination with a semaphore having rigid arms extending therefrom, of means on the shutter for engaging one of said arms to move the semaphore into registration with the sight opening, and means associated with the film advancing mechanism for engaging the other arm to move the semaphore out of registration upon the advance of the film.

5. In a camera having a shutter adjustable for time exposures, the combination with a semaphore, of an abutment on the shutter adapted to engage the semaphore to move the same upon the movement of the shutter in one direction, but inoperative to move the semaphore upon the movement of the shutter in the opposite direction.

6. In a camera having a shutter adjustable for time exposures, the combination with a semaphore, of means on the shutter for actuating the semaphore upon the movement of the shutter in one direction, said means being inoperative to move the semaphore upon the movement of the shutter in the opposite direction.

7. In a camera having an oscillatory shutter, adjustable for time exposures, the combination with a semaphore having an arm projecting therefrom, an abutment on the shutter arranged to engage said arm to move the semaphore upon the movement of the shutter in one direction, the extent of movement of the arm being such that it will lie out of the path of movement of the abutment upon the movement of the shutter in the opposite direction.

Signed at New York, in the county of New York, and State of New York, this 28th day of October, A. D. 1916.

GEORGE W. WEISS.

Witnesses:
MORRIS NEWMAN,
R. D. WHITROFF.